United States Patent
Vogel et al.

(10) Patent No.: US 9,947,907 B2
(45) Date of Patent: Apr. 17, 2018

(54) HOUSING COMPOSED OF A METAL FRAME STRUCTURE AND A PLASTIC COMPONENT FOR ACCOMMODATING A CELL STACK

(71) Applicant: Robert Bosch GmbH, Stuttgart (DE)

(72) Inventors: Veronika Vogel, Struttgart (DE); Jens Ackermann, Stuttgart (DE)

(73) Assignee: ROBERT BOSCH GMBH, Stuttgart (DE)

(*) Notice: Subject to any disclaimer, the term of this patent is extended or adjusted under 35 U.S.C. 154(b) by 175 days.

(21) Appl. No.: 14/776,285

(22) PCT Filed: Mar. 12, 2014

(86) PCT No.: PCT/EP2014/054765
§ 371 (c)(1),
(2) Date: Sep. 14, 2015

(87) PCT Pub. No.: WO2014/140060
PCT Pub. Date: Sep. 18, 2014

(65) Prior Publication Data
US 2016/0043365 A1    Feb. 11, 2016

(30) Foreign Application Priority Data
Mar. 12, 2013    (DE) .................. 10 2013 204 180

(51) Int. Cl.
*H01M 2/10*      (2006.01)
*H01M 10/04*     (2006.01)
(Continued)

(52) U.S. Cl.
CPC ..... *H01M 2/1077* (2013.01); *H01M 10/0481* (2013.01); *H01M 10/613* (2015.04);
(Continued)

(58) Field of Classification Search
None
See application file for complete search history.

(56) References Cited

U.S. PATENT DOCUMENTS 5,800,942 A * 9/1998 Hamada ................ B60K 1/04
                                               429/120
9,083,029 B2   7/2015 Lee et al.
(Continued)

FOREIGN PATENT DOCUMENTS

DE    102010012930    9/2011
DE    102010013002    9/2011
(Continued)

OTHER PUBLICATIONS

International Search Report for PCT/EP2014/054765, dated Jul. 29, 2014.

*Primary Examiner* — Scott J Chmielecki
(74) *Attorney, Agent, or Firm* — Norton Rose Fulbright US LLP; Gerard Messina

(57) ABSTRACT

A housing is provided for accommodating a cell stack. The housing has a side wall and a frame structure. The side wall is designed as a plastic component. The side wall has a first accommodation area and a second accommodation area. The frame structure is designed for preloading the cell stack. The frame structure has a first rail fixed in the first accommodation area and a second rail fixed in the second accommodation area. The first rail and the second rail are oriented transversely to the side wall.

18 Claims, 4 Drawing Sheets

(51) Int. Cl.
*H01M 10/625* (2014.01)
*H01M 10/647* (2014.01)
*H01M 10/6554* (2014.01)
*H01M 10/613* (2014.01)

(52) U.S. Cl.
CPC ....... *H01M 10/625* (2015.04); *H01M 10/647* (2015.04); *H01M 10/6554* (2015.04); *H01M 2/1016* (2013.01); *H01M 2/1061* (2013.01); *H01M 2/1072* (2013.01); *H01M 2/1083* (2013.01); *H01M 2/1088* (2013.01); *H01M 2220/20* (2013.01)

(56) References Cited

U.S. PATENT DOCUMENTS

| | | | | |
|---|---|---|---|---|
| 2006/0024566 | A1* | 2/2006 | Plummer | B60R 16/04 429/100 |
| 2008/0280194 | A1* | 11/2008 | Okada | H01M 2/1077 429/99 |
| 2011/0150602 | A1* | 6/2011 | Sieper | B29C 45/0005 411/378 |

FOREIGN PATENT DOCUMENTS

| | | | | |
|---|---|---|---|---|
| DE | 102011109246 | | 2/2013 | |
| DE | 102011109246 A1 | * | 2/2013 | .......... H01M 2/1077 |
| EP | 1990861 | | 11/2008 | |
| JP | 2002203527 A | | 7/2002 | |
| JP | 2009170258 A | | 7/2009 | |
| JP | 2010257650 A | | 11/2010 | |
| JP | 2012015040 A | | 1/2012 | |
| JP | 2012160347 A | * | 8/2012 | |
| JP | 2013037913 | | 2/2013 | |
| WO | WO2012/067045 | | 5/2012 | |
| WO | WO2012/120091 | | 9/2012 | |
| WO | WO2012/133710 | | 10/2012 | |

* cited by examiner

HOUSING COMPOSED OF A METAL FRAME STRUCTURE AND A PLASTIC COMPONENT FOR ACCOMMODATING A CELL STACK

FIELD OF THE INVENTION

The present invention relates to a housing for accommodating a cell stack, to a battery, to a method for manufacturing a battery, and to a method for manufacturing a fiber-reinforced plastic component for a housing of a battery.

BACKGROUND INFORMATION

A battery for a vehicle may have a housing, by which the battery cells may be protected, for example, from environmental influences.

German Published Patent Application No. 10 2010 013 002 describes a battery including a cell stack which is situated in a housing composed of metal plates.

SUMMARY

Against this background, the present invention introduces a housing for accommodating a cell stack, furthermore a battery and a method for manufacturing a battery, and finally a method for manufacturing a fiber-reinforced plastic component.

A housing for accommodating a cell stack for a battery has the following features:
a side wall which is designed as a plastic component, the side wall having a first accommodation area and a second accommodation area; and
a metal frame structure for preloading the cell stack, the frame structure having a first rail fixed in the first accommodation area and a second rail fixed in the second accommodation area, the first rail and the second rail being oriented transversely to the side wall.

The side wall may, for example, have a rectangular outline. The first accommodation area may be situated in the area of a first corner of the side wall and the second accommodation area may be situated in the area of a second corner of the side wall.

A housing may be understood as a housing structure, for example, a housing or a part of a housing. The cell stack may be shielded from the surroundings by the housing. A cell stack may be understood as a number of, for example, prismatic battery cells including, for example, a rectangular base. The bases of the battery cells may be oriented in a common plane in the cell stack. The battery cells may each be situated with a long side facing one another and the narrow sides of the battery cells may be oriented in a plane. With respect to a first battery cell and a last battery cell, a long side may be free in each case and represent a face of the battery stack in each case. On a top surface, the battery cells may each have at least two electrical terminals. In the cell stack, in a series connection of the battery cells from one cell to the next cell, the terminals may be designed as alternating, so that a short distance needs to be bridged between the individual terminals. In a parallel connection of the battery cells, the terminals of adjacent cells may be oriented in the same direction. Each battery cell may have its own battery cell housing. An outline of the side wall may be understood as an edge of the body of the side wall. An accommodation area may, for example, have a recess. The accommodation area may also have one or multiple guide surfaces. The accommodation areas may have a predetermined distance to the outline. A frame structure may additionally be designed to accommodate primarily tensile forces. A rail may, for example, have an L-shaped cross section. The rails may, for example, be extruded profiles. The rails may be made from a lightweight metal, for example, aluminum or an aluminum alloy. The rails may be connected to the side wall via, for example, a form-locked or a force-fitting connection. The connections of the rails to the side wall may be designed to be releasable.

The plastic component may be designed as a fiber-reinforced plastic component. A fiber-reinforced plastic component may be composed of a thermoplastic or a duroplastic polymer including reinforcing fibers. Fiber-reinforced plastics, in particular fiber-reinforced thermoplastic or duroplastic polymers, are able to withstand loads similar to a metal material at a lower weight than the metal material and additionally do not require corrosion protection. By using a correctly dimensioned design in terms of load, plastic components may be used for transferring forces to components which are to be preloaded. Due to the combination of planar, fiber-reinforced plastic components and approximately rod-shaped metal components, significantly higher compressive forces may be transferred to the cell stack than by using a purely plastic structure, and, in comparison to a purely metal embodiment variant, a housing for the battery cells is provided which is greatly reduced in weight, is not susceptible to corrosion, and is inexpensive.

The plastic component may thereby have a three-dimensional contour and a reinforcing rib structure. The reinforcing fibers may be present in the plastic component in a first subarea as a fabric, a scrim, a multiaxial scrim, a knit, a warp-knit, a braid, and/or fleece nonwoven fabric. In a second subarea of the plastic component, the reinforcing fibers may be present as short fibers and/or long fibers. The first subarea may be provided as an undeformed semifinished product. The first subarea may be made deformable by heat exposure and be deformed by pressure and/or tension. The second subarea may be molded onto the first subarea by injection molding, and may form an integral bond with the first subarea. The first subarea may have a three-dimensional contour. In the first subarea, the semifinished product may be deformed from an original plane of the semifinished product. The second subarea may be formed as ribs. The ribs may, for example, be designed as star-shaped, honeycombed, triangular, or diamond-shaped embossed over the first subarea. The ribs may improve a rigidity of the semifinished product against aggressive forces. In particular, a flexural rigidity of the semifinished product may be improved by projecting ribs.

According to one specific embodiment, the side wall may have a third accommodation area and a fourth accommodation area. The frame structure may have a third rail fixed in the third accommodation area and a fourth rail fixed in the fourth accommodation area. The third rail and the fourth rail may thereby be oriented transversely to the side wall. The third accommodation area may be situated in an area of a third corner of the side wall and the fourth accommodation area may be situated in the area of a fourth corner of the side wall. The cell stack may be held very well by the additional third and fourth rails.

The rails of the metal frame structure may each have an axial recess for accommodating in each case a longitudinal edge of the cell stack. The accommodation areas may form a cast of a cross section of a rail in order to more securely guide the rail.

The first rail and the second rail of the frame structure may each have an axial accommodation area for a cooling plate. An axial accommodation area may extend along the rail and have an essentially constant cross section. For example, the accommodation area may be designed for the purpose of inserting a cooling plate axially so that the cooling plate is securely held in the accommodation area. For this purpose, the cooling plate may have recesses into which the accommodation area engages, or the accommodation area may have a recess into which the cooling plate may be inserted. Due to the accommodation area for the cooling plate, the battery cells may be effectively cooled or tempered.

The rails may each be connected to the side wall via a screw connection. A screw connection of this type offers an easy to handle and secure connection possibility between the rails and the side wall.

The rails may be connected to the side wall in each case via a screw adapter and in each case a nut. The screw adapters may penetrate the side wall and the nuts may be screwed onto the screw adapters on a side of the side wall facing away from the frame structure. A screw adapter may be a connection part for the rail. Thus, the rail may be provided axially with a thread despite a continuous cross section. The screw adapter may be fixedly connected to the rail. The screw adapter may have a toothing for engaging in recesses of the rail. The screw adapter may have an axially threaded bolt. The screw adapter may also have an axially threaded hole. A screw may then penetrate the side wall and connect the rail to the side wall.

The housing may have a housing part which has a U-shaped cross section having a first surface, a second surface oriented transversely to the first surface, and a third surface oriented transversely to the second surface. The housing part may thereby abut against the side wall. The first rail may be situated in a first joint edge between the first surface and the second surface. The second rail may be situated in a second joint edge between the second surface and the third surface. A third rail may be situated on an edge of the first surface opposite the first joint edge. A fourth rail may be situated on an edge of the third surface opposite the second joint edge. The housing part may be made from a fiber-reinforced plastic material. The housing part may have a predetermined distance from the rails. The housing part may also directly abut against the rails. The housing part may be connected to the rails. The housing part may have a seal on each of the two opposite ends in order to be able to seal fluid tight against the side wall and an additional side wall. The side wall may have an indentation or an elevation which forms a shape of the housing part and/or supports the housing part.

The housing part may be composed of a first section and at least one second section, the first section and the second section each having the U-shaped cross section of the housing part and being connected to one another at an interface. By combining sections of different lengths, housing parts of different lengths may be manufacturable. A modular structure of the housing may be provided by at least two sections. For example, the first section may be as long as a depth of a first number of battery cells, for example two battery cells. The second section may, for example, be as long as a depth of a second number of battery cells, for example three battery cells. Through different combinations of the sections, arbitrarily long housings may be provided for batteries having different numbers of cells. The same side wall may be respectively used thereby while a length of the rails may be adapted to the length of the housing part. The sections may be connected in a form-locked manner and/or integrally bonded to one another in order to protect the battery cells.

The housing may have a cover which closes an open side of the housing part and abuts against the first surface, the side wall, and the third surface. The cover may complete the housing around the battery cells. The cover may have openings in which terminals of the battery may be situated in order to configure the terminals to be accessible. The cover may have a degassing channel which is designed for the purpose of collecting and discharging gases emitted from the battery cells. The cover may have recesses for cell terminals, via which the battery cells are connected to one another electrically conductively at the terminals. Likewise, strip conductors may be integrated into the cover which are designed for the purpose of conducting signal currents, for example, from temperature and voltage measurements, to a device for controlling and monitoring the entire system. The cover may have a circumferential seal which may be connected detachably or permanently to the housing part and the side walls.

The housing may have an additional side wall which is constructed identically to the already cited side wall. The additional side wall may be connected to the frame structure on an end of the frame structure opposite to the already cited side wall. The first rail may be fixed in an additional first accommodation area. The second rail may be fixed in an additional second accommodation area. A third rail may be fixed in an additional third accommodation area. A fourth rail may be fixed in an additional fourth accommodation area. The additional side wall may be connected to the rails via additional screw adapters. The additional side wall may be drawn against the cell stack by the rails and squeeze the cell stack against the side wall so that the battery functions with high efficiency.

Furthermore, a battery is introduced which has the following features:

a cuboidal cell stack composed of at least two cells including a prismatic base, the cell stack having a first longitudinal edge, a second longitudinal edge, a third longitudinal edge, and a fourth longitudinal edge, and a first face and an opposite second face, the first longitudinal edge, the second longitudinal edge, the third longitudinal edge, and the fourth longitudinal edge being oriented in parallel to one another and transversely to the first face and to the second face; and a housing according to the concept introduced here, the side wall abutting against the first face of the cell stack and the first longitudinal edge of the cell stack abutting against the first rail and the second longitudinal edge of the cell stack abutting against the second rail.

A third longitudinal edge of the cell stack may abut against a third rail and the fourth longitudinal edge of the cell stack may abut against a fourth rail.

The battery may have a cooling plate which is situated in an axial accommodation area of the first rail and in an axial accommodation area of the second rail and has thermal contact with the cell stack. The cooling plate may be situated inside of the housing part.

Furthermore, a method is introduced for manufacturing a battery according to the concept presented here, the method including the following steps:

providing a mentioned housing;
providing a cuboidal cell stack composed of at least two cells including a prismatic base, the cell stack having a first longitudinal edge, a second longitudinal edge, a third longitudinal edge, and a fourth longitudinal edge, and a first face and an opposite second face, the first longitudinal edge, the second longitudinal edge, the third longitudinal edge, and the fourth longitudinal edge being oriented in parallel to one another and transversely to the first face and to the second face;

arranging the cell stack in the housing so that the side wall abuts against the first face of the cell stack, the first longitudinal edge of the cell stack abuts against the first rail, and the second longitudinal edge of the cell stack abuts against the second rail;

providing a housing part which has a U-shaped cross section with a first surface, a second surface oriented transversely to the first surface, and a third surface oriented transverse to the second surface; and arranging the housing part on the housing so that the housing part abuts against the side wall, the first rail is situated in a first joint edge between the first surface and the second surface of the housing part, and the second rail is situated in a second joint edge between the second surface and the third surface of the housing part.

Furthermore, a method is introduced for manufacturing a fiber-reinforced plastic component including a three-dimensional contour and a reinforcing rib structure, in particular a side wall of a housing according to the concept presented here, the method including the following steps:

providing a plate made from a fiber-reinforced semifinished product having a thermoplastic matrix;

The plate may be accommodated in a clamping frame. The clamping frame is used for better handling of the plate. heating or tempering the plate to a deformation temperature of the matrix in order to obtain a deformable plate;

inserting the deformation-ready plate in the clamping frame into an open injection molding tool, the injection molding tool forming a mold cavity between two tool halves, which forms the contour and the rib structure of the plastic component as a cast;

closing the injection molding tool, an edge of the deformation-ready plate being held in the clamping frame in order to maintain tension on the plate and to prevent the formation of folds in the plate during the three-dimensional deformation between two tool halves, a residual volume remaining in the rib structure; and filling the residual volume of the injection-ready injection molding tool with a plasticized thermoplastic material in order to mold the rib structure onto the contour and simultaneously to completely reproduce the contour of the two tool halves using the fiber-reinforced semifinished product having a thermoplastic matrix with the aid of the injected melt.

A plate may already essentially have the dimensions of the plastic component. The plate may have a protrusion for sliding down during the deformation. A deformation temperature may be lower than a melting temperature of the thermoplastic polymer. If the thermoplastic material is at the deformation temperature, the material may be paste-like. For example, the plate may be tempered in an oven using infrared heating. A clamping frame may be a clamping device which is designed for the purpose of exerting a predetermined clamping force on the plate. The clamping frame may be situated along a circumference of the plate. During deformation, the material of the plate may slide down in the clamping frame in order to compensate for a change in length due to the deformation. The mold cavity may essentially be as tall in the area of the contour as the plate is thick. During closing of the injection molding tool, the plate may, for example, be penetrated to form accommodation areas, whereby due to the deformability of the plate, the reinforcing fibers may be laterally displaced without weakening the material. A residual volume may be a residual mold cavity when the plate is situated in the closed injection molding tool. The residual volume may essentially be situated in the area of the rib structure. The residual volume may also include multiple subareas which may be separately supplied with thermoplastic material during filling in order to completely fill the mold cavity. During filling, the thermoplastic material may mix with the thermoplastic material of the plate. The two materials may be based on the same polymer. The two materials may be based on different polymers. The thermoplastic material may be reinforced during the filling step with short fibers and/or long fibers. The method may include a removal step, in which the plastic component is removed from the injection mold when it is solidified. Furthermore, the method may include a cutting step in which the edge is cut to an outline of the plastic component.

A battery module housing, for example for prismatic lithium-ion cells, might be manufactured from welded sheet metal. This construction out of sheet metal results in a high mass for the battery module housing.

The mass of the battery peripherals, which includes a high-voltage connection system, a cooling system, electronics, the housing, and a charging system, and is responsible for a safe and controlled operation of the battery system, should, however, be kept preferably low, since the mass of an electric vehicle determines the capacity required for the battery system, and the mass of an electric vehicle is already, due to the battery system, higher than the mass of a vehicle with a conventional drive.

The plastic housing introduced here has a housing which may be used for any lithium-ion or NiMH battery module for an electric vehicle or a hybrid vehicle. The plastic housing may be designed as separable in order to be able to scale the battery module according to the desired cell number. In the concept presented here, prismatic cells are predominantly used which are connected via cell connectors.

DETAILED DESCRIPTION

Figure 1:
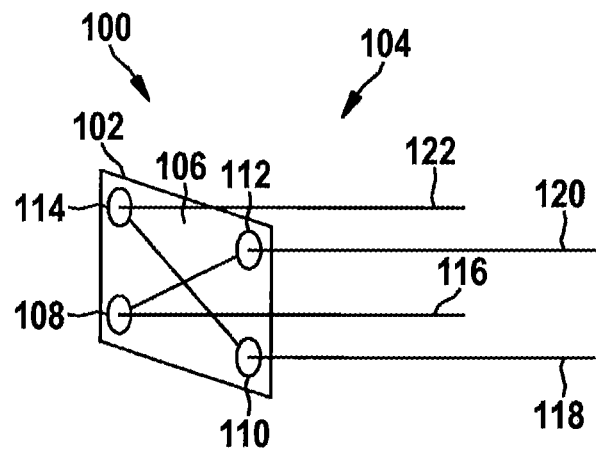
FIG. 1 shows a schematic representation of a housing according to one exemplary embodiment of the present invention.

In the subsequent description of preferred exemplary embodiments of the present invention, identical or similar reference numerals will be used for the elements represented in the different figures and acting similarly, a repeated description of these elements being omitted.

FIG. 1 shows a schematic representation of a housing 100 for accommodating a cell stack according to one exemplary embodiment of the present invention. Housing 100 has a side wall 102 and a frame structure 104. Side wall 102 is designed as a plastic component. Optionally, side wall 102 may be designed as a fiber-reinforced plastic component including a three-dimensional contour and a reinforcing rib structure 106.

Side wall 102 preferably has a rectangular outline. In the area of a first corner, side wall 102 has a first accommodation area 108 and a second accommodation area 110 in the area of a second corner. In the area of a third corner and in the area of a fourth corner, side wall 102 may have a third accommodation area 112 and a fourth accommodation area 114.

Frame structure 104 is made of metal and is designed for the purpose of preloading the cell stack. Frame structure 104 has a first rail 116 and a second rail 118. Furthermore, frame structure 104 may have a third rail 120 and a fourth rail 122.

According to the exemplary embodiment shown, first rail 116 is fixed in first accommodation area 108. Second rail 118 is fixed in second accommodation area 110. Third rail 120 is fixed in third accommodation area 112. Fourth rail 122 is fixed in fourth accommodation area 114. First rail 116, second rail 118, third rail 120, and fourth rail 122 are oriented transversely to side wall 102 and in each case have an axial recess for accommodating a longitudinal edge of the cell stack.

Housing 100 has different tasks. It fixes the lithium-ion cells during the assembly process and ensures the necessary bracing of the cells for the problem-free function of the battery system. This bracing may be applied according to the concept presented here with the aid of a frame structure 104, in which the cells may be exactly positioned.

Figure 2:
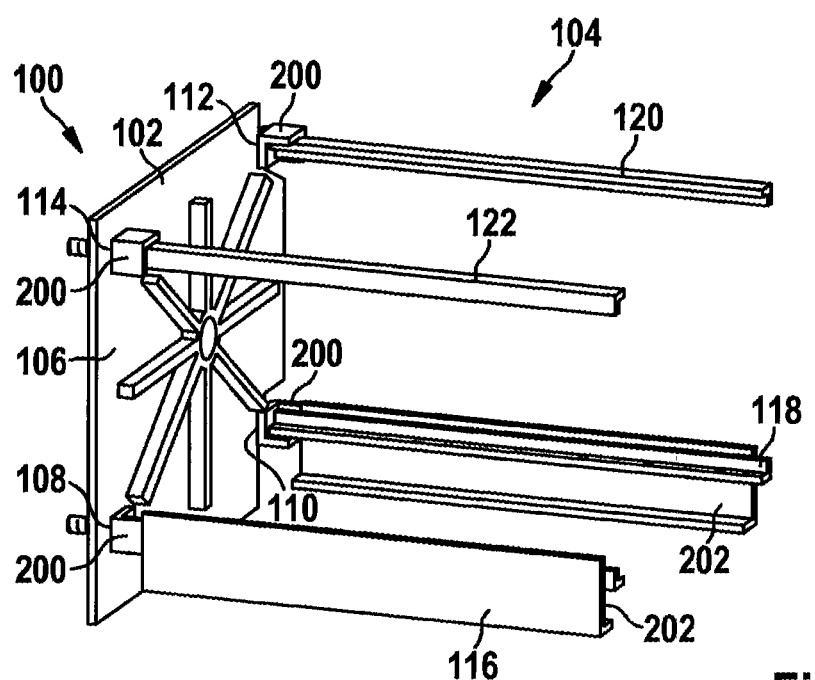
FIG. 2 shows a representation of a housing according to one exemplary embodiment of the present invention.

FIG. 2 shows a representation of a housing 100 for accommodating a cell stack according to one exemplary embodiment of the present invention. The housing corresponds to the principle structure of the housing shown in FIG. 1. FIG. 2 shows side wall 102 including rail system 104. Side wall 102 is designed as a plastic-plastic hybrid component. Side wall 102 has been manufactured using a method for manufacturing a fiber-reinforced plastic component including a three-dimensional contour and a reinforcing rib structure according to one exemplary embodiment of the present invention. To manufacture side wall 102, a provided plate, made of a fiber-reinforced semifinished product having a thermoplastic matrix, is accommodated in a clamping frame, and is tempered to a deformation temperature of the matrix in order to obtain a deformation-ready plate. The deformation-ready plate held in the clamping frame is inserted into an open injection molding tool. The injection molding tool forms a mold cavity between two tool halves, which forms the contour and rib structure 106 of side wall 102 as a cast. During closing of the injection molding tool, in order to transfer the injection molding tool into an injection-ready state, an edge of the deformation-ready plate is clamped in the clamping frame with a predetermined clamping force in order to hold the plate under tension. During the closing, the deformation-ready plate is drawn between the two tool halves into the contour of side wall 102. A residual volume remains in rib structure 106 of the mold cavity. A plasticized thermoplastic material is injected into the residual volume of the now injection-ready injection molding tool in order to form rib structure 106 on the contour. Due to the pressure of the melt flowing in, the tool contour is completely molded by the previously deformed semifinished product. Rib structure 106 is designed as star-shaped here. A junction of rib structure 106 is designed as an annular rib for casting optimization. Four accommodation areas 108, 110, 112, 114 are designed as through holes through side wall 102. On the side facing away from the rails, accommodation areas 108, 110, 112, 114 each have a contact surface for a screw or a nut. Screw adapters 200 are situated in accommodation areas 108, 110, 112, 114 and are fixedly connected to rails 116, 118, 120, 122. Rails 116, 118, 120, 122 are designed as extruded profiles made of aluminum. First rail 116 and second rail 118 each additionally have an axial accommodation area 202 for a cooling plate. First rail 116 and second rail 118 therefore have an F-shaped profile, the axial recess for accommodating the cell stack being formed by the open L-shaped angle of the profile. Axial accommodation area 202 is formed by the U-shaped part of the profile. Third rail 120 and fourth rail 122 have only an L-shaped profile, which forms the axial recess for accommodating the cell stack. Screw adapters 200 encompass in each case the L-shaped profile or the L-shaped profile part and are connected with high tensile strength to rails 116, 118, 120, 122.

Figure 3:
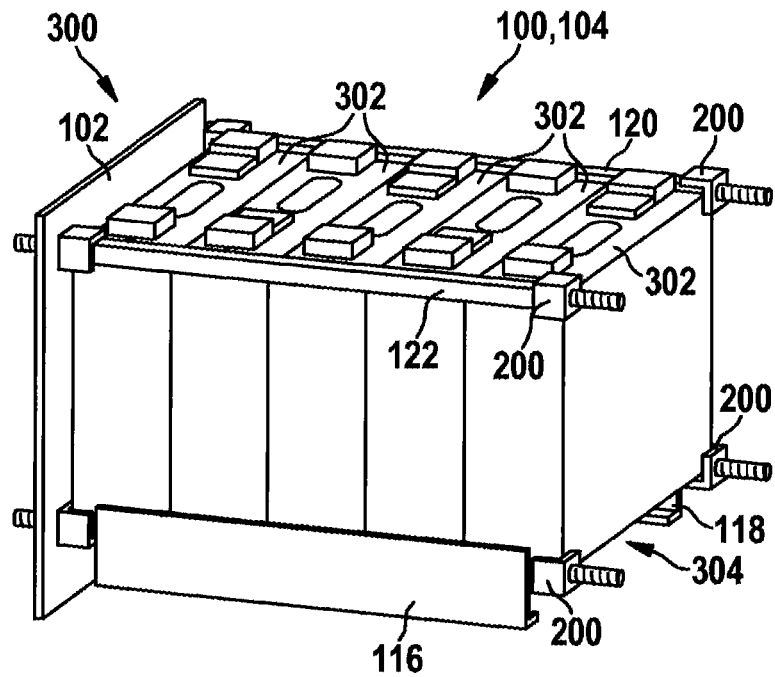
FIG. 3 shows a representation of a part of a battery according to one exemplary embodiment of the present invention.

FIG. 3 shows a representation of a battery 300 according to one exemplary embodiment of the present invention. In FIG. 3, cells 302 and a cooling plate 304 are inserted into rail system 104. In other words, FIG. 3 shows housing 100 for energy storage cells 302 including frame structure 104, as this is represented in FIGS. 1 and 2.

Cells 302 have a rectangular base and a prismatic cell body. Cells 302 are situated adjacent to one another in such a way that each cell 302 abuts with its long side against the long side of an adjacent cell 302. Cells 302 are connected into a cell stack which is subsequently in part likewise designated with reference numeral 302. Cells 302 are inserted into the axial recesses of rails 116, 118, 120, 122 so that a longitudinal edge of cells 302 is surrounded by rails 116, 118, 120, 122. The cell stack, five identically constructed cells 302 in this exemplary embodiment, has a face abutting against side wall 102. In this exemplary embodiment, cell stack 302 abuts against the rib structure. At the free ends of rails 116, 118, 120, 122, four additional screw adapters 200 are situated. Screw adapters 200 each have, in this exemplary embodiment, an axial threaded bolt which engages in the accommodation areas of side wall 102. Screw adapters 200 may, for example, also have a threaded hole, whereby a screw would then be situated in each accommodation area. In the representation, first rail 116 and second rail 118 are situated below, while third rail 120 and fourth rail 122 are situated above. Cells 302 are inserted into frame structure 104 in such a way that electrical contacts of cells 302 lie above and are situated between third rail 120 and fourth rail 122. The electrical terminals are thereby situated alternatingly in the exemplary embodiment represented here. A positive pole follows a negative pole in each case, and vice versa. Cooling plate 304 is inserted into the accommodation area of lower rails 116, 118, and abuts against an underside of cells 302 in order to temper battery 300.

In the following, one exemplary embodiment will be described in which cells 302 are designed, for example, as lithium-ion cells. With the exception of the contacting points on the cell terminals, lithium-ion cells 302 are electrically insulated. For this purpose, the metal cell container may be manually painted. The cell insulation may also be established using (deep-drawn) films. For insulating between cells 302, according to the concept presented here, in particular according to the requirements, simple plastic plates, plastic films, or insulation paper may be used. By using plastic plates or films, an increased expense for meeting safety and environmental protection guidelines as well as a long painting and drying process during the painting may be avoided. In addition, the films or plates have a uniform thickness, due to which a variation in the cell dimensions caused by the manual painting, which may lead to problems in the subsequent assembly, may be prevented. Deep-drawn films are not possible for all cell sizes due to the draft angles necessary there. Furthermore, inserted plates or films offer a reduced thermal contact between cells 302. The deep-drawn, prismatic cell containers already ensure a certain mechanical stability in and of themselves; however, battery module housing 100 increases the mechanical stability of battery system 300 in the case of a crash.

Figure 4:
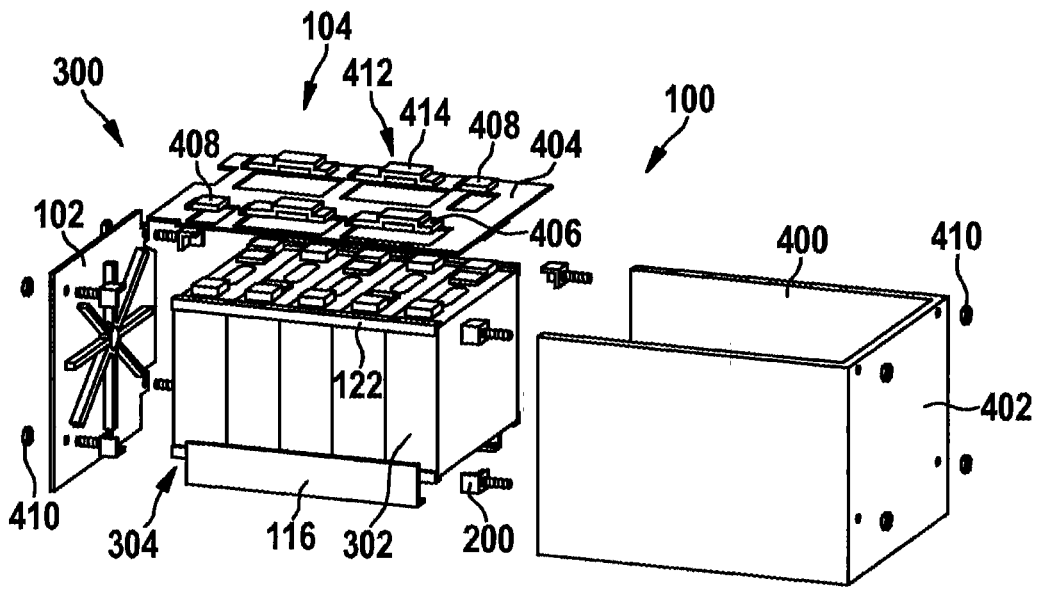
FIG. 4 shows an exploded representation of a battery according to one exemplary embodiment of the present invention.

FIG. 4 shows an exploded representation of a battery 300 in the form of a module according to one exemplary embodiment of the present invention. Battery 300 corresponds to the battery in FIG. 3. FIG. 4 thus shows a module 300 according to the concept presented here including frame system 104, battery housing 100, and with five lithium-ion cells 302 in an exploded representation. In addition, battery 300 has a housing part 400 and an additional side wall 402. Furthermore, battery 300 has a cover 404 including cell connectors 406 and terminals 408. Housing part 400 has a U-shaped cross section. Housing part 400 is a plastic component. Three surfaces are situated in each case at right angles to one another. The cross section of housing part 400 is large enough that housing part 400 may completely enclose the frame structure including cell stack 302 situated therein. Housing part 400 has an open side. This open side corresponds to the upper side of cells 302. The additional side wall 402 corresponds to side wall 102. Additional side wall 402 is situated on a face of cell stack 302 opposite side wall 102. Additional side wall 402 is designed as the mirror image of side wall 102. Side wall 102 and additional side wall 402 are connected to screw adapters 200 by nuts 410. Cover 404 is situated on the upper side. Cover 404 is likewise a plastic component. Cover 404 has large openings and small openings. The large openings are situated in each case over electrical terminals of adjacent battery cells 302. In each case, cell connectors 406 are situated in the large openings. Cell connectors 406 connect the two electrical contacts of cells 302. In this exemplary embodiment, cells 302 are connected in series. At the first electrical contact and the last electrical contact, respectively, of the series connection, a terminal 408 is situated for a next module (not shown). Terminals 408 are situated in the small openings of the cover. Cell connectors 406 and terminals 408 are respectively covered by cover caps 412 for cell connectors 406 and cover caps 414 for the poles and thus are protected from environmental influences and inadvertent touching.

According to one exemplary embodiment, frame system 104 is designed as rail system 104 made of metal, via which cells 302 are braced and which simultaneously takes on the fixing of the cell stack and cooling plate 304 during assembly. All operating forces, which result from the bracing of cells 302 and their volume change as a result of breathing during operation, are absorbed by this rail system 104 and two side walls 102, 402, which are preferably manufactured with the aid of injection molding. Additional housing 400 may merely be used as a cover panel and does not need to absorb additional forces. According to the module size, the length of rail system 104 may be adapted. In addition, plastic cover panel parts 400, 404 are introduced which enclose the entire cell stack 302 and are preferably manufactured with the aid of injection molding. Due to the division of these plastic cover panel parts 400 into meaningful part sizes, for example the common housing 100 of two- or three-cell assemblages, all module sizes may be constructed using only two different component sizes. However, in FIG. 4, housing 400 is represented as an individual component. The seal between these cover panel segments 400 may be implemented either by a shaped molded sealing lip or by a form-fit or integral fit, for example by gluing or welding. Plastic housing 400 assumes the functions of insulating module 300 thermally and also electrically and seals against media. The absorption of all forces, and the fixing of cells 302, are carried out via rail system 104 and side walls 102, 402.

Battery modules 300 may be used with a different number of cells 302; therefore, an individual housing would be necessary for each module size for a housing composed of sheet metal. This would result in a high diversity of parts, a high number of variants, and a high proportion of manual labor during the assembly. Due to the modular structure of the housing presented here, battery 300 may be manufactured inexpensively and with little logistic complexity.

In the concept presented here, battery module 300 has a modularly structured system made of plastic cover panel parts 102, 400, 402, 404, and metal rails 116, 118, 120, 122. With the aid of rail system 104, cells 302 may be positioned very exactly during the assembly and clamped without the use of a device.

By using plastic cover panel parts 400 in dimensions of two and three cells 302, a meaningful modular system may be assembled which enables the covering of all module sizes with few components.

By using this concept, in addition to reducing the number and variety of parts, the costs and the weight of housing 100 of battery module 300 may be simultaneously reduced.

The approach described here presents a concept for housing 100 of a battery system 300 made of metal rails 116, 118, 120, 122 and plastic cover panel parts 102, 400, 402, 404, which enables a simplified assembly process.

Figure 5:
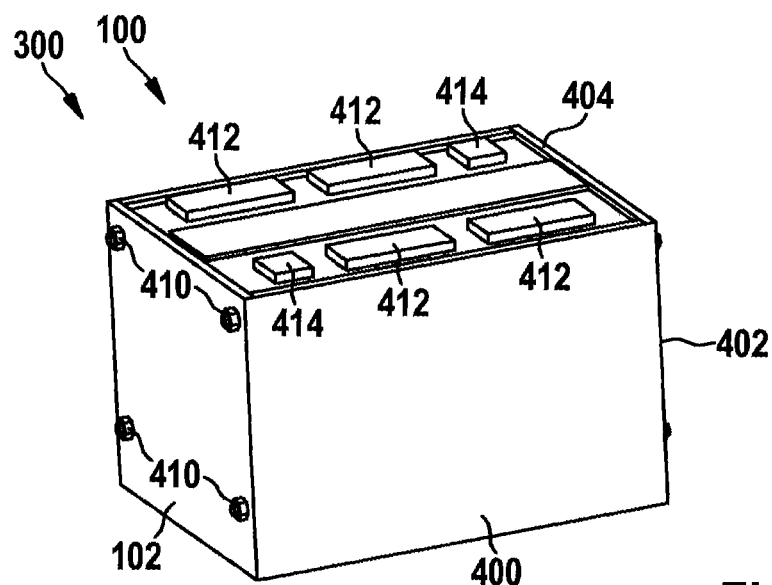
FIG. 5 shows a representation of an assembled battery according to one additional exemplary embodiment of the present invention.

FIG. 5 shows a representation of a battery 300 according to one additional exemplary embodiment of the present invention. Battery 300 corresponds to the battery in FIG. 4. FIG. 5 shows the module 300 from FIG. 4 in the assembled state. Battery 300 is completely enclosed by side walls 102, 402, housing part 400 and cover 404. Housing part 400 seals against side walls 102, 402. Cover 404 seals against side walls 102, 402 and against housing part 400. Side walls 102, 402 are connected at high tension to each other by rails. Using nuts 410, side walls 102, 402 are clamped against one another. The battery cells are clamped between side walls 102, 402 and preloaded thereby. Cover caps 412 for cell connectors 406 and cover caps 414 for poles 408 are situated in the large and small openings of cover 404 and thus protect the electrical terminals of battery 300 from environmental influences and inadvertent touching.

The housing, shown here as a battery module housing composed of components 102, 400, 402, 404, prevents the penetration of media from outside, for example salt water, and also the escape of reaction products of the lithium-ion cells in the event of damage. In order to guarantee the optimal operating temperature of the lithium-ion cells, battery module housing 102, 400, 402, 404 takes on a portion of the tempering of the cells in addition to the actual tempering system.

Housing 100 for battery module 300 according to the present concept differs from other housings in that a separation takes place of the mechanical functions from the housing functions. The mechanical functions are assumed by metal components. The housing function is satisfied by plastic components 102, 400, 402, 404. In this way, the weight of battery module housing 100 may be significantly reduced in comparison to metal housings. In the case of a breakdown of the plastic cover panel elements 400 into meaningful elements, only a few different components are necessary in order to form all module and stack sizes, which results in a significant reduction in component and assembly costs.

Cover 404 of module 300 may be designed as a component. Cover caps 412, 414 prevent the cell connectors from being subjected to inadvertent touching after the contacting.

To reduce assembly time, cover 404 may be designed as a two-part component, which is preferably manufactured with the aid of injection molding. Numerous functions may be integrated into cover 404. By extrusion coating of cell connectors and lead frames, the signal transmission and the precursor to cell contacting may already be integrated during the injection molding. Alternatively, the signal transmission may be implemented in cover 404 with the aid of MID (Molded Interconnect Devices, three-dimensional electronic assemblies). The subsequent application of conductor paths has the advantage that changes to the circuit may be implemented merely by reprogramming the device which applies these conductor paths. If, in contrast, changes are to be carried out on a circuit which is implemented with the aid of an extrusion coated lead frame, then a change to the injection molding tool is also required in addition to the change to the lead frame and the corresponding tool. Furthermore, cover 404 contains a continuous degassing channel. The seals on cover 404 (for the degassing vent and for cell housing 102, 400, 402) may be molded in a subsequent step or may be molded directly during the injection of cover 404 with the aid of a two component tool and a two component injection molding machine using transfer molding technology. Cover 404 may either be a one-part component, or it is preferably manufactured as a two-part component. In a one-part cover 404, the degassing channel may, for example, be blown out. In a two-part cover 404, the degassing channel may result through joining, preferably through welding of top and bottom parts of cover 404.

Cover caps 412, 414, which are placed over the cell connectors after the cells have been contacted, are used merely for touch protection. They may be manufactured, for example, as injection molded components, preferably made of PP. In order to make positive and negative terminals visually identifiable, it is proposed to designate cover caps 412, 414 using different colors.

In other words, FIG. 5 shows battery 300 including a cuboidal shaped cell stack composed of at least two cells including a prismatic base body. The cell stack has a first longitudinal edge, a second longitudinal edge, a third longitudinal edge, and a fourth longitudinal edge, and also a first face and an opposite second face, the first longitudinal edge, the second longitudinal edge, the third longitudinal edge, and the fourth longitudinal edge being oriented in parallel to one another and transversely to the first face and the second face. Furthermore, battery 300 includes a frame structure for preloading the cell stack. The frame structure has a first metal support rail, a second metal support rail, a first metal guide rail, and a second metal guide rail. The first support rail has thereby a first axial accommodation area for a cooling plate and a first axial recess in which the first longitudinal edge of the cell stack is situated. The second support rail has a second axial accommodation area for the cooling plate and a second axial recess in which the second longitudinal edge of the cell stack is situated. The first guide rail has a third axial recess in which the third longitudinal edge of the cell stack is situated and the second guide rail has a fourth axial recess in which the fourth longitudinal edge of the cell stack is situated. Furthermore, battery 300 has a housing 100 made of a plastic material which is designed for the purpose of accommodating the cell stack. Housing 100 has a first side wall 102, a second side wall 402, a housing part 400, and a cover 404. First side wall 102 abuts against the first face of the cell stack. Second side wall 402 abuts against the second face of the cell stack. First side wall 102 and second side wall 402 are connected with tensile strength to the frame structure and are designed as fiber reinforced plastic components including a three dimensional contour and a reinforcing rib structure.

Housing part 400 is situated between first side wall 102 and second side wall 402 and seals toward first side wall 102 and second side wall 402. Housing part 400 has a U-shaped cross section with a first surface, a second surface oriented transversely to the first surface, and a third surface oriented transversely to the second surface. The first support rail is situated in a first joint edge between the first surface and the second surface. The second support rail is situated in a second joint edge between the second surface and the third surface. The first guide rail is situated in an edge of the first surface opposite the first joint edge, and the second guide rail is situated on an edge of the third surface opposite the second joint edge. Cover 404 closes an open side of housing part 400 and seals the first surface, first side wall 102, the third surface, and second side wall 402.

Housing 100 for accommodating the cell stack includes housing part 400 which has a first surface, a second surface oriented transversely to the first surface, and a third surface oriented transversely to the second surface. Housing part 400 has a U-shaped cross section. The first surface is connected to the second surface at a first joint edge. The second surface is connected to the third surface at a second joint edge. Housing part 400 is made of a plastic material. Housing 100 additionally has a first side wall 102, which is designed as a fiber-reinforced plastic component including a three-dimensional contour and a reinforcing rib structure, and abuts against the first surface, the second surface, and the third surface at an open first side of housing part 400. A main extension plane of first side wall 102 is thereby oriented transversely to the first surface, the second surface, and the third surface. Housing 100 additionally has a second side wall 402, which is identically constructed to first side wall 102. Second side wall 402 is situated congruently to first side wall 102 on a second open side of housing part 400 and abuts against the first surface, the second surface, and the third surface. A main extension plane of second side wall 402 is oriented transversely to the first surface, the second surface, and the third surface. Furthermore, the housing has a first metal support rail with a first axial recess for accommodating a first longitudinal edge of the cell stack and with a first axial accommodation area for a cooling plate. The first support rail is situated in a first joint and extends from first side wall 102 to second side wall 402. The first support rail is connected with tensile strength to first side wall 102 and second side wall 402. Furthermore, housing 100 has a second metal support rail with a second axial recess for accommodating a second longitudinal edge of the cell stack and with a second axial accommodation area for a cooling plate. The second support rail is situated in a second joint and extends from first side wall 102 to second side wall 402. The second support rail is connected with tensile strength to first side wall 102 and second wall 402. Furthermore, housing 100 has a first metal guide rail with a third axial recess for accommodating a third longitudinal edge of the cell stack. The first guide rail is situated in parallel to the first support rail on an edge of the first surface opposite the first joint and extends from first side wall 102 to second side wall 402. The first guide rail is connected with tensile strength to first side wall 102 and second side wall 402. Furthermore, housing 100 has a second metal guide rail with a fourth axial recess for accommodating a fourth longitudinal edge of the cell stack. The second guide rail is situated in parallel to the second support rail on an edge of the third surface opposite the second joint and extends from first side wall 102 to second side wall 402. The second guide rail is connected with tensile strength to first side wall 102 and second side wall 402. Finally, housing 100 includes a cover which, at a third open side of housing 400, abuts against the first surface, side wall 102, the third surface, and second side wall 402, and is made of a plastic material.

Figure 6:
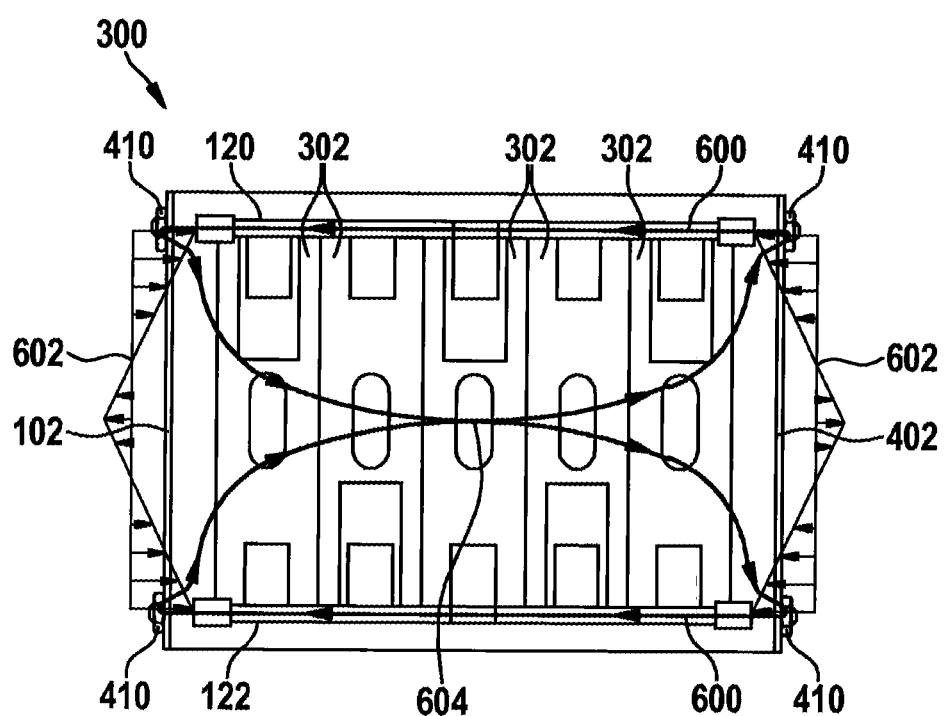
FIG. 6 shows a representation of a power flow in a battery according to one exemplary embodiment of the present invention.

FIG. 6 shows a representation of a power flow in a battery 300 according to one exemplary embodiment of the present invention. The battery corresponds to the battery in FIG. 5. In contrast to FIG. 5, the cover is not shown here. Likewise, the cover caps, cell connectors, and terminals are not shown. FIG. 6 shows a top view onto the upper side of battery 300. The electrical terminals of five battery cells 302 are exposed. A tensile force 600 (tension) through third rail 120 and a tensile force 600 through fourth rail 122 are shown. Corresponding tensile forces are transmitted through the first rail and the second rail on the lower side of battery 300. Tensile forces 600 are applied by nuts 410 which respectively support themselves on side wall 102 and additional side wall 402. Due to tensile forces 600, side walls 102, 402 are exposed to a bending load 602 (bend), which has a maximum in the center between the rails. The rib structure reinforces side walls 102, 402. Thereby, side walls 102, 402 may withstand bending load 602 without a large deflection. Side walls 102, 402 thus bend only a little. Therefore, side walls 102, 402 transmit tensile force 600 as surface pressure to the two faces of cell stack 302. In cells 302, a pressure load (604) (pressure) is created by the surface pressure, which is necessary to counteract a volume change of the cells during operation as a result of so-called breathing.

Figure 7:
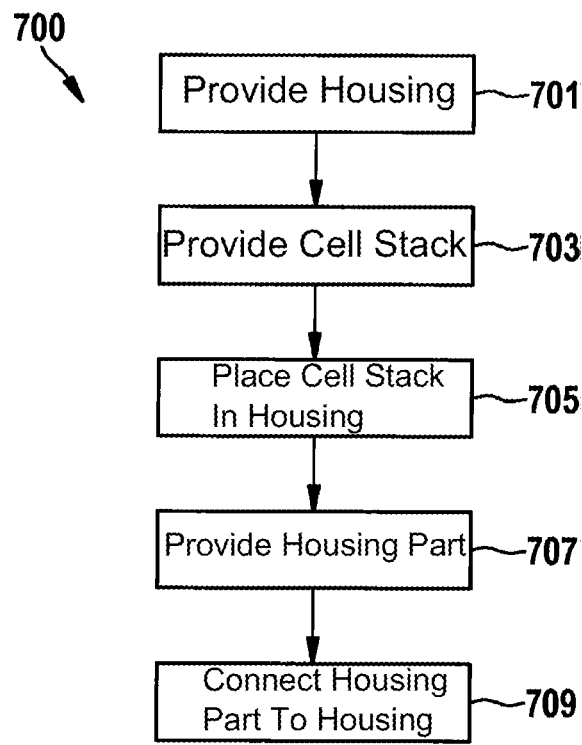
FIG. 7 shows a flow chart of a method for manufacturing a battery according to one exemplary embodiment of the present invention.

FIG. 7 shows a flow chart for a method 700 for manufacturing a battery according to one exemplary embodiment of the present invention. Using the method described here, a battery, for example as shown in FIG. 4, may be manufactured.

In step 701, a housing is provided, as is shown for example in FIG. 1, and in step 703 a cuboidal cell stack is provided composed of at least two cells. In step 705, the cell stack is accommodated in the housing. In step 707, a housing part is provided which has a U-shaped cross section. This housing part is connected to the housing in step 709.

According to one exemplary embodiment, the side wall of the housing may be equipped with four screw adapters. These screw adapters have a thread so that they may be respectively fixed to the side wall by screwing with a nut. The screw adapters each accommodate two rails for above and below (preferably made of aluminum and potentially coated). After the preassembly of this frame structure, the entire cell stack, the number of cells being thereby dependent on the size of the module, may be pushed into the frame and is fixed by the same. The cooling plate may also be simply pushed into the frame. Simple plastic plates, films, or insulating paper, for example, may be used for insulation between the cells. In the case that a cooling plate is made of metal, then insulation is also necessary at the cell base. In the case that a cooling plate is made of plastic, this insulation may be omitted.

After inserting the cell stack in step 705, four identically constructed screw adapters may be fixed on the rail ends, and an additional side wall or a complete housing part, as is shown in FIG. 4, may be pushed over the system composed of a first side wall, rails, and cells. Subsequently, a nut is screwed onto the thread of each screw adapter. Due to the tightening of the nuts, the side wall is tightened onto the cell stack and the cells are preloaded via the system composed of rails, side walls, in particular the molded-on ribs of the side walls, screw adapters, and nuts. FIG. 6 schematically shows the power flow.

Figure 8:
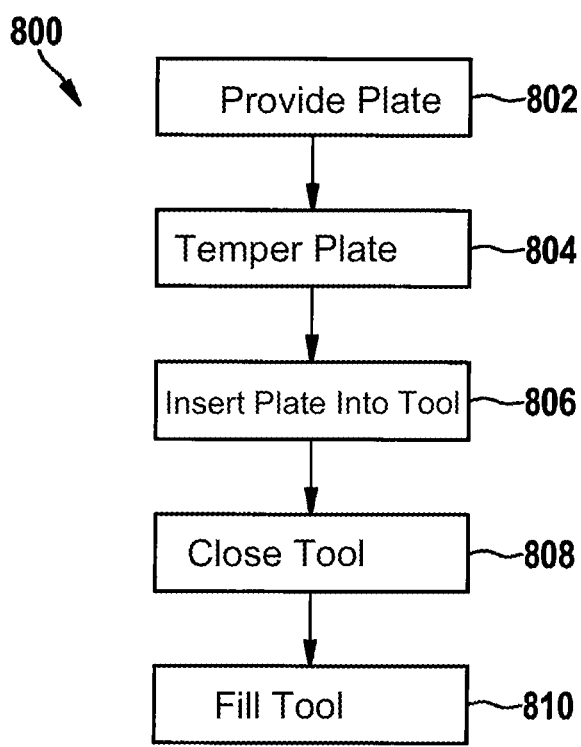
FIG. 8 shows a flow chart of a method for manufacturing a side wall according to one exemplary embodiment of the present invention.

FIG. 8 shows a flow chart for a method 800 for manufacturing a fiber-reinforced plastic component including a three-dimensional contour and a reinforcing rib structure according to one exemplary embodiment of the present invention. Using method 800 described here, a side wall, as is described in FIG. 2, may be manufactured. Method 800 has a step 802 of providing, a step 804 of tempering, a step 806 of inserting, a step 808 of closing, and a step 810 of filling. In step 802 of providing, a plate made of a fiber-reinforced semifinished product having a thermoplastic matrix is provided. In step 804 of tempering, the plate is tempered to a deformation temperature of the matrix in order to obtain a deformation-ready plate. For easier handling of the plate, it is previously fixed in a clamping frame. In step 806 of inserting, the deformation-ready plate, which is fixed in a clamping frame, is inserted into an open injection molding tool. The injection molding tool forms a mold cavity between two tool halves, which forms the contour and the rib structure of the plastic component as a cast. In step 808 of closing, the injection molding tool is closed. An edge of the deformation-ready plate is thereby clamped by the clamping frame in order to hold the plate under tension and to prevent the formation of folds during the three-dimensional deformation. Due to the closing, the injection molding tool is shifted into an injection-ready state and simultaneously the deformation-ready plate is drawn into the contour between the two tool halves. A residual volume remains in the rib structure. In step 810 of filling, the residual volume of the injection-ready injection molding tool is filled with a plasticized thermoplastic material in order to mold the rib structure onto the contour and completely reproduce the contour of the tool with the deformed semifinished product using the pressure of the inflowing melt.

Using method 800 as described in FIG. 8, the side wall, as it is described in FIGS. 1 through 6, may be manufactured as a plastic-plastic hybrid component. For this purpose, an already impregnated and consolidated fabric semifinished product having a thermoplastic matrix (organic sheet) may be deformed during closing 808 of the injection molding tool and subsequently extrusion coated 810, or functional elements may be molded, like the accommodation areas for the screw adapters.

By using (fiber composite) plastic components for the housing of battery modules, the mass of this housing may be significantly reduced in comparison to a metal housing. The manufacture of the plastic components is carried out preferably through injection molding. Possible reinforcements are preferably inserts made of already impregnated and consolidated fabric semifinished products having a thermoplastic matrix (organic sheets) or metal inserts. The manufacture of plastic components in injection molding enables high lot sizes at simultaneously low prices and the manufacture of highly integrated components.

The metal frame structure guarantees mechanical stability, ensures fixing of the cells and the cooling plate, and a secure clamping of the cells.

The exemplary embodiments described and shown in the figures are only selected by way of example. Different exemplary embodiments may be combined completely with one another or with respect to individual features. The exemplary embodiment may also be supplemented by features from another exemplary embodiment. Furthermore, method steps according to the present invention may be repeated and carried out in a sequence that differs from the sequence described.

What is claimed is:

1. A housing for accommodating a cell stack for a battery, comprising:
    a side wall including a plastic component, the side wall having a first accommodation area and a second accommodation area, wherein the first accommodation area and the second accommodation area are through holes through the side wall;
    a metal frame structure for preloading the cell stack, the frame structure having a first rail fixed in the first accommodation area and a second rail fixed in the second accommodation area, the first rail and the second rail being oriented transversely to the side wall;
    wherein the first rail and the second rail of the frame structure each has an F-shaped profile, an axial recess of each of the first rail and second rail being formed by an open L-shaped angle of the F-shaped profile, the axial recess for accommodating a longitudinal edge of cells of the cell stack, and wherein each of the first rail and the second rail has an axial accommodation area for accommodating a cooling plate, the axial accommodation area being formed by a U-shaped part of the F-shaped profile.

2. A housing for accommodating a cell stack for a battery, comprising:
    a side wall including a plastic component, the side wall having a first accommodation area and a second accommodation area; and
    a metal frame structure for preloading the cell stack, the frame structure having a first rail fixed in the first accommodation area and a second rail fixed in the second accommodation area, the first rail and the second rail being oriented transversely to the side wall;
    wherein the plastic component is a fiber-reinforced plastic component including a three-dimensional contour and a reinforcing rib structure,
    wherein the first rail and the second rail of the frame structure each has an F-shaped profile, an axial recess of each of the first rail and second rail being formed by an open L-shaped angle of the F-shaped profile, the axial recess for accommodating a longitudinal edge of cells of the cell stack, and wherein each of the first rail and the second rail has an axial accommodation area for accommodating a cooling plate, the axial accommodation area being formed by a U-shaped part of the F-shaped profile.

3. The housing as recited in claim 1, wherein:
    the side wall has a third accommodation area and a fourth accommodation area,
    the frame structure has a third rail fixed in the third accommodation area and a fourth rail fixed in the fourth accommodation area, and
    the third rail and the fourth rail are oriented transversely to the side wall.

4. The housing as recited in claim 1, wherein the rails are each connected to the side wall by a screw connection.

5. The housing as recited in claim 1, further comprising a housing part having a U-shaped cross section with a first surface, a second surface oriented transversely to the first surface, and a third surface oriented transversely to the second surface, wherein:
    the housing part abuts against the side wall,
    the first rail is situated in a first joint edge between the first surface and the second surface, and
    the second rail is situated in a second joint edge between the second surface and the third surface.

6. The housing as recited in claim 5, wherein:
    the housing part includes a first section and at least one second section, the first section and the second section each having the U-shaped cross section of the housing part and are connected to one another at an interface, and by combining sections of different lengths, housing parts of different lengths may be manufacturable.

7. The housing as recited in claim 6, further comprising a cover that closes an open side of the housing part and abuts against the first surface, the side wall, and the third surface.

8. The housing as recited in claim 1, further comprising an additional side wall identically constructed to the side wall, wherein:
    the additional side wall is connected to the frame structure at an end of the frame structure opposite to the side wall, and
    the first rail is fixed in an additional first accommodation area and the second rail is fixed in an additional second accommodation area.

9. A battery, comprising:
    a cuboidal cell stack including at least two cells that include a prismatic base, the cell stack having a first longitudinal edge, a second longitudinal edge, a third longitudinal edge, and a fourth longitudinal edge, and a first face and an opposite second face, the first longitudinal edge, the second longitudinal edge, the third longitudinal edge, and the fourth longitudinal edge being oriented in parallel to one another and transversely to the first face and to the second face; and
    a housing including:
        a side wall including a plastic component, the side wall having a first accommodation area and a second accommodation area, wherein the first accommodation area and the second accommodation area are through holes through the side wall, and
        a metal frame structure for preloading the cell stack, the frame structure having a first rail fixed in the first accommodation area and a second rail fixed in the second accommodation area, the first rail and the second rail being oriented transversely to the side wall, wherein the side wall abuts against the first face of the cell stack, the first longitudinal edge of the cell stack abuts against the first rail, and the second longitudinal edge of the cell stack abuts against the second rail,
        wherein the first rail and the second rail of the frame structure each has an F-shaped profile, an axial recess of each of the first rail and second rail being formed by an open L-shaped angle of the F-shaped profile, the axial recess for accommodating a longitudinal edge of the at least two cells of the cell stack, and wherein each of the first rail and the second rail has an axial accommodation area for accommodating a cooling plate, the axial accommodation area being formed by a U-shaped part of the F-shaped profile.

10. The housing as recited in claim 3, wherein the third and fourth accommodation areas are through holes through the side wall, and wherein the housing further comprises:
   third and fourth screw adapters, each of the third and fourth screw adapters having an L-shaped profile part connected with high tensile strength to the third rail and the fourth rail, respectively, and each of the third and fourth screw adapters having an end that extends through the third and fourth accommodation area, respectively, each end including one of an axial threaded bolt or a threaded hole.

11. The housing as recited in claim 2, wherein the reinforcing rib structure is star-shaped.

12. The housing as recited in claim 2, wherein the fiber-reinforced plastic component includes a fiber-reinforced plate having a thermoplastic matrix, and wherein the reinforcing rib structure is injection molded onto the fiber-reinforced plate.

13. The housing as recited in claim 12, wherein the reinforcing rib structure is star-shaped.

14. The housing as recited in claim 1, wherein the plastic component is a fiber-reinforced plastic component including a reinforcing rib structure.

15. The housing as recited in claim 14, wherein the fiber-reinforced plastic component includes a fiber-reinforced plate having a thermoplastic matrix, and the reinforcing rib structure is injection molded onto the fiber-reinforced plate.

16. The housing as recited in claim 15, wherein the reinforcing rib structure is star-shaped.

17. The housing as recited in claim 1, further comprising:
   first and second screw adapters, each of the first and second screw adapters having an L-shaped profile part connected to the first rail and the second rail, respectively, and each of the first and second screw adapters having an end that extends through the first and second accommodation areas, respectively, each end including one of an axial threaded bolt or a threaded hole.

18. The battery as recited in claim 9, wherein the housing further includes first and second screw adapters, each of the first and second screw adapters having an L-shaped profile part connected to the first rail and the second rail, respectively, and each of the first and second screw adapters having an end that extends through the first and second accommodation areas, respectively, each end including one of an axial threaded bolt or a threaded hole.

* * * * *